United States Patent [19]

Heine

[11] 4,311,815

[45] Jan. 19, 1982

[54] PROCESS FOR THE PRODUCTION OF MOLDINGS BASED ON POLYURETHANES

[75] Inventor: Heinrich Heine, Leverkusen, Fed. Rep. of Germany

[73] Assignee: Bayer Aktiengesellschaft, Bayerwerk, Fed. Rep. of Germany

[21] Appl. No.: 163,678

[22] Filed: Jun. 27, 1980

[30] Foreign Application Priority Data

Jul. 7, 1979 [DE] Fed. Rep. of Germany ....... 2927597

[51] Int. Cl.$^3$ ..................... C08G 18/32; C08G 18/54; C08G 18/08
[52] U.S. Cl. .................................. 525/504; 528/44; 528/76; 528/77; 528/78; 528/79; 528/902
[58] Field of Search .................. 528/44, 76–79, 528/902; 525/504

[56] References Cited

U.S. PATENT DOCUMENTS

| | | | |
|---|---|---|---|
| 2,929,800 | 3/1960 | Hill | 260/77.5 |
| 3,192,185 | 6/1965 | Achterhof et al. | 260/75 |
| 3,310,533 | 3/1967 | McElroy | 260/77.5 |
| 3,620,680 | 11/1971 | Bartel et al. | 260/77.5 |
| 3,850,880 | 11/1974 | Hakanson et al. | 260/75 |
| 3,894,994 | 7/1975 | Day et al. | 260/75 |
| 3,966,662 | 6/1976 | Olstowski | 260/30.6 |
| 4,093,674 | 6/1978 | Tsutsui et al. | 260/830 P |
| 4,145,515 | 3/1979 | Pogozelski et al. | 528/77 |

FOREIGN PATENT DOCUMENTS

1071457  6/1967  United Kingdom.
1150508  4/1969  United Kingdom.

*Primary Examiner*—H. S. Cockeram
*Attorney, Agent, or Firm*—Gene Harsh; Joseph C. Gil

[57] ABSTRACT

The instant invention is directed to a process for the production of moldings based on polyurethanes comprising reacting organic polyhydroxyl compounds with organic polyisocyanates in quantitative ratios corresponding to an NCO/OH equivalent ratio of from 0.8:1 to 1.2:1, wherein said polyhydroxyl compounds are selected from the group consisting of:

(a) alkoxylation products of ammonia containing 3 hydroxyl groups and having a molecular weight of at least 149 and a hydroxyl group content of at least 12% by weight, (b) alkoxylation products of aromatic polyamines containing at least 4 hydroxyl groups and having a molecular weight of at least 284 and a hydroxyl group content of at least 12% by weight, (c) phenol/formaldehyde condensates containing at least 3 phenolic hydroxyl groups and having a phenolic hydroxyl group content of at least 12% by weight, (d) mixtures of (a), (b), and (c), and (e) mixtures containing at least 25% by weight of at least one of the polyhydroxyl compounds mentioned in (a), (b), and (c) with other polyhydroxyl compounds optionally containing ether or ester groups and having a molecular weight in the range of from 62 to 3000, said mixture having a mean OH functionality of at least 2.7 and a hydroxyl group content of at least 12% by weight, wherein said reaction is conducted at a temperature from 0° to 100° C. to form a solid, powderable and fusible reaction product which contains free isocyanate and hydroxyl groups, but which will not react further in said temperature range.

6 Claims, No Drawings

PROCESS FOR THE PRODUCTION OF MOLDINGS BASED ON POLYURETHANES

BACKGROUND OF THE INVENTION

This invention relates to a process for the production of moldings based on polyurethanes by reacting organic polyisocyanates with selected polyhydroxyl compounds to form an intermediate product containing free isocyanate and hydroxyl groups which is present in the "B-stage," i.e., an intermediate product which is stable in storage at temperatures below 100° C., more particularly at temperatures below 40° C., solid and capable of being powdered and melted, and subsequently hardening this intermediate product, accompanied or followed by forming a molding.

Solid polyurethanes in the so-called "B-stage," i.e., partial reaction products of organic polyisocyanates and polyhydroxyl compounds, which still contain free isocyanate and hydroxyl groups at room temperature, but which nevertheless, are stable in storage at room temperature or moderately elevated temperature and can only be hardened by the action of heat, have not been known before. On the other hand, intermediate-stage mixtures such as these would represent interesting one-component systems which could be stored at room temperature and hardened at any time by the action of heat.

It has now surprisingly been found that combinations of organic polyisocyanates of the type known from polyurethane chemistry can be reacted with selected polyhydroxyl compounds described in detail hereinafter to form intermediate stages which are stable in storage at from 0° to 40° C., particularly at room temperature, and which still contain free isocyanate and hydroxyl groups, and hence, are capable of being cross-linked under the effect of heat.

DESCRIPTION OF THE INVENTION

The present invention also relates to a process for the production of moldings based on polyurethanes comprising reacting organic polyhydroxyl compounds with organic polyisocyanates in quantitative ratios corresponding to an NCO/OH equivalent ratio of from 0.8:1 to 1.2:1, wherein said polyhydroxyl compounds are selected from the group consisting of:
(a) alkoxylation products of ammonia containing 3 hydroxyl groups and having a molecular weight of at least 149 and a hydroxyl group content of at least 12% by weight,
(b) alkoxylation products of aromatic polyamines containing at least 4 hydroxyl groups and having a molecular weight of at least 284 and a hydroxyl group content of at least 12% by weight,
(c) phenol/formaldehyde condensates containing at least 3 phenolic hydroxyl groups and having a phenolic hydroxyl group content of at least 12% by weight,
(d) mixtures of (a), (b), and (c), and
(e) mixtures containing at least 25% by weight of at least one of the polyhydroxyl compounds mentioned in (a), (b), and (c) with other polyhydroxyl compounds optionally containing ether or ester groups and having a molecular weight in the range of from 62 to 3000, said mixture having a mean OH functionality of at least 2.7 and a hydroxyl group content of at least 12% by weight, wherein said reaction is conducted at a temperature from 100° to 250° C. and said reaction is terminated just before gelation of the reaction mixture, which is liquid at temperatures in this range, by cooling to a temperature below 100° C., and wherein said reaction mixture is powderable and fusible and contains free isocyanate and hydroxyl groups and which is solid below 100° C.

The polyhydroxyl compounds used in the present invention are described in (a) through (e) below.

(a) They may be alkoxylation products of ammonia having a molecular weight in the range of from 149 to 420, a hydroxyl functionality of 3 and a hydroxyl group content of at least 12% by weight. Alkoxylation products of ammonia free from ether groups such as triethanolamine, tripropanolamine, particularly triisopropanolamine, or triisobutanolamine are preferred. Corresponding trialkanolamines with different hydroxylalkyl radicals, of the type obtainable, for example, by alkoxylating mono- or dialkanolamines with alkylene oxides (such as ethylene oxide or propylene oxide) may also be used. The alkylene oxide used for the alkylation reaction should differ from the hydroxylalkyl radical of the hydroxylalkyl amine to be alkoxylated as to its carbon chain.

(b) The polyhydroxyl compounds may be alkoxylation products of aromatic diamines containing at least 4 hydroxyl groups and having a molecular weight in the range of from 284 to 570 and a hydroxyl group content of at least 12% by weight. Compounds in which the hydroxylalkyl radicals contain at most 1 ether group on a statistical average and particularly compounds in which the hydroxylalkyl radicals are free from ether groups and are preferred. These compounds may be obtained by the alkoxylation, particularly with ethylene oxide and/or propylene oxide, of aromatic polyamines such as 1,4-diaminobenzene, 2,4-diaminotoluene, 2,6-diaminotoluene, 4,4'-diaminodiphenyl methane, 2,4'-diaminodiphenyl methane, or polyamine mixtures of the diphenyl methane series formed by condensing aniline with formaldehyde.

(c) The polyhydroxyl compounds may be phenol/formaldehyde condensates, or "novolaks," which have a hydroxyl functionality of at least 3, and a hydroxyl group content of at least 12, generally from around 15 to 17% by weight. It is preferred that they have a softening point of from about 75° to 150° C., preferably from 75° to 100° C., and a viscosity in a 30% solution in cresol/xylene (1:1) of from about 100 to 1000, preferably from 250 to 500 mPa.s. Phenol/formaldehyde condensates such as these containing phenolic hydroxyl groups may be obtained, for example, in accordance with Kunststoff-Handbuch, Vol. X, "Duroplaste" by Vieweg/Becker, Carl-Hanser-Verlag, Munich, 1968, pages 30 and 47/48, of Methoden der Organischem Chemie, Makomolekulare Stoffe, Part 2, Houben-Weyl, Vol XIV/2, pages 272–273, Georg Thieme Verlag, Stuttgart.

(d) Mixtures of the above-described polyhydroxyl compounds may also be used.

(e) It is also possible to use mixtures of organic polyhydroxyl compounds which contain at least 25% by weight, preferably at least 50% by weight of at least one of the polyhydroxyl compounds mentioned in (a) to (c) and which, in addition to these polyhydroxyl compounds essential to the present invention, contain hydroxyl compounds optionally containing ether or ester groups and having a molecular weight of from 62 to 3000, which are different from the polyhydroxyl compounds mentioned in (a) to (c). The mixtures should also have a mean hydroxyl functionality of at least 2.7 and a hydroxyl group content of at least 12% by weight.

Any known aliphatic, cycloaliphatic, araliphatic or aromatic polyisocyanates may be used in the process according to the present invention, such as tetramethylene diisocyanate, hexamethylene diisocyanate, dodecamethylene diisocyanate, cyclohexane-1,3- and 1,4-diisocyanate and mixtures of these isomers, 1-isocyanate-3,3,5-trimethyl-5-isocyanatomethyl cyclohexane, 1,3- and 1,4-phenylene diisocyanate, 2,4- and 2,6-tolylene diisocyanate and mixtures of these isomers, 2,4- and 2,5-hexahydrotolylene diisocyanate and mixtures of these isomers, diphenylmethane-4,4'-diisocyanate, naphthylene-1,5-diisocyanate, triphenylmethane-4,4',4-triisocyanate, polyphenyl-polymethylene-polyisocyanates of the type obtained by condensing aniline with formaldehyde, followed by phosgenation, polyisocyanates containing carbodiimide-isocyanate adducts (German Pat. No. 1,092,007), diisocyanates of the type described in U.S. Pat. No. 3,492,330, polyisocyanates containing allophanate groups (British Pat. No. 994,890, Belgian Pat. No. 761,626 and published Dutch patent application No. 7,102,524), polyisocyanates containing isocyanurate groups (German Pat. Nos. 1,022,789 and 1,027,394 and German Offenlegungsschriften Nos. 1,929,034 and 2,004,048), polyisocyanates containing biuret groups (German Pat. No. 1,101,394, British Pat. No. 889,050 and French Pat. No. 7,017,514), polyisocyanates produced by telomerization reactions (Belgian Pat. No. 723,640) and polyisocyanates containing ester groups (British Pat. Nos. 956,474 and 1,072,956). Aliphatic, cycloaliphatic, araliphatic or aromatic polyisocyanates of the type described by W. Siefken in Justus Liebig's Annalen der Chemie, 562, pages 75 to 136 may be used. Reaction products of the above-mentioned isocyanates with acetals (German Pat. No. 1,072,385) and isocyanates of the type described in German Pat. Nos. 1,022,789 and 1,027,394 may also be used. It is also possible to use mixtures of the above-mentioned polyisocyanates.

The preferred organic polyisocyanates are polyisocyanates of the diphenylmethane series which are liquid at room temperature, i.e., the phosgenation product of aniline/formaldehyde condensates, liquid mixtures of 2,4'- and 4,4'-diisocyanatodiphenylmethane; 4,4'-diisocyanatodiphenylmethane or 1-isocyanato 3,3,5-trimethyl-5-isocyanatomethyl cyclohexane (isophorone diisocyanate) liquefied by converting some of the isocyanate groups into carbodiimide or urethane groups.

Auxiliaries and additives suitable for use in the present invention are, for example, drying agents (such as zeolite powder, orthoformic acid triethyl ester), fillers (such as quartz powder, chalk or aluminum oxides), pigments (such as titanium dioxide and iron oxide), organic pigments (such as phthalocyanine pigments), plasticizers (such as dioctylphthalate, dibutylphthalate or triphenyl phosphate) or soluble organic dyes.

To carry out the process according to the present invention, the polyisocyanates and the polyhydroxyl compounds are mixed with one another in quantities which correspond to an NCO:OH equivalent ratio of from 0.8:1 to 1.2:1, more particularly of the order of 1:1. The auxiliaries and additives exemplified may be added either to the mixture or the above-mentioned starting materials.

After the reactants have been mixed, the reaction mixture is further treated by one of the two methods described below.

(a) The reaction mixture is stored at a temperature in the range of from 0° to 100° C., preferably at a temperature in the range of from 0° to 40° C. Partial reaction of the isocyanate groups with the hydroxyl groups results in the formation of a reaction product which is solid at temperatures in the above-mentioned range and which contains isocyanate hydroxyl groups detectable, for example, by IR-spectroscopy, but which nevertheless, has not hardened completely on account of the solid aggregate state of the product, i.e., it is still stable in storage at temperatures in the above-mentioned range. The mixture thus formed is brittle and may readily be reduced to a powder. In many cases, it is soluble in conventional solvents such as methylethyl ketone, methylisobutyl ketone, acetic acid ethyl ester or mixtures of these polar solvents with aromatic hydrocarbons. On heating to between 100° and 250° C., preferably between 120° and 180° C., the systems present in the so-called "B-stage" melt before finally hardening through reaction of the free isocyanate and hydroxyl groups still present in them.

(b) The reaction mixtures are reacted by heating to between 100° and 250° C., preferably between 160° and 200° C., optionally after intermediate storage at from 0° to 100° C. The reaction is terminated shortly before gelation of the reaction mixture, which is liquid at temperatures in this range, by cooling to below 100° C. and preferably to below 40° C. This results in the formation of intermediate stages which are also in the "B-stage" and which have the properties mentioned in (a) above.

The temperature to be selected from the above-mentioned temperature ranges for method (a) is determined by the type of starting materials used and may be reliably determined by a brief preliminary test. The same also applies in regard to the temperatures used for method (b) and in regard to the time at which the reaction has to be terminated by freezing. Method (b) is recommended in particular where starting mixtures solid at temperatures in the range of from 0° to 100° C. are used. Where starting mixtures which are liquid at temperatures in the range of from 0° to 100° C. are used, both methods may be applied.

The systems obtained by methods (a) or (b) are storable at room temperature and may be processed at any time after their production to form cross-linked, infusible moldings. To this end, the "B-stage" systems may, for example, be powdered, optionally provided with further auxiliaries and additives of the type already mentioned or with catalysts for the isocyanate addition reaction and hardened after or during forming, for example, in molds, at a temperature in the range of from 100° to 250° C., preferably at a temperature in the range of from 120° to 180° C. When the "B-stage" systems are heated to this hardening temperature, the intermediate products melt before their final cross-linking to form readily formable melts. Hardening of the "B-stage" intermediate products after or during forming may even be carried out in the presence of solvents of the type exemplified by dissolving the intermediate products in such a solvent, forming the resulting solution and then hardening it at a temperature in the above-mentioned range, followed or accompanied by removal of the solvent by distillation.

The process according to the present invention is especially suitable for the production of moldings, particularly for the electrical industry (such as insulators, switch components, coverings for electronic components, transformers, transducers and the like) or as binders for heat-cross-linkable powder lacquers or solvent-containing lacquers for the production of coatings of any type. The starting materials used in the process according to the present invention may even be directly processed to form moldings of the type exemplified, i.e., without the isolation of the "B-stage" intermediate product essential to the present invention. In this case, the particularly high compatability of the polyhydroxyl compounds used in accordance with the present invention with the polyisocyanates is particularly advantageous.

The percentages quoted in the following Examples represent percent by weight, unless otherwise indicated.

EXAMPLE 1

100 parts by weight of triisopropanolamine are mixed with 10 parts by weight of a paste of 50% zeolite powder and 50% castor oil. The resulting mixture is heated to 120° C. and then degassed for 30 minutes with stirring under a vacuum of 1 mbar. After cooling to room temperature, 290 parts by weight of quartz powder (mean grain size 0.4 mm) are added to the polyol. The mixture thus obtained is finally mixed at room temperature with 190 parts by weight of isophorone diisocyanate (NCO/OH equivalent ratio=1:0.9). The mixture thus obtained, which is liquid at room temperature, is stored for 8 days. During this period, the reaction mixture thickens and solidifies. The solidified reaction mixture still contains isocyanate and hydroxyl groups which are detectable by IR-spectroscopy. The hardened material is ground in a double-runner disc mill to form a powder having a particle diameter of approximately 0.5 mm which is then introduced into a mold treated with a release agent. Under a pressure of approximately 40 kp/cm² and at a temperature of 160° C., the powder melts once again and coalesces to form a homogeneous, bubble-free plate, on which the following values were determined after tempering for 16 hours at 160° C.

| Flexural strength | (DIN 53452) | MPa | 124 |
|---|---|---|---|
| Impact strength | (DIN 53453) | kJ/m² | 7 |
| Martens temperature | (DIN 53462) | °C. | 134 |

EXAMPLE 2

100 parts by weight of a novolak of phenol and formaldehyde having an OH content of 16% by weight, a mean hydroxyl functionality of approximately 6, a softening point of from 75° to 90° C. and a viscosity in a 30% solution in cresol/xylene (1:1) of approximately 350 mPa.s, are heated to 200° C. and stirred at that temperature with a polyisocyanate mixture according to Example 1 (NCO/OH equivalent ratio:1:1) which has also been heated to 200° C. The two components are immediately compatible at that temperature. After stirring for 30 seconds, the mixture is cast into a metal mold heated to 80° C. in which it hardens in about 5 minutes. Thereafter, a homogeneous, hard but friable plate containing a few bubbles can be removed from the mold and is ground in a double runner disc mill to form a powder having a mean particle diameter of 0.2 mm. This powder can be further processed in different ways:

(a) 100 parts by weight of the powder are thoroughly mixed with 100 parts by weight of quartz powder, after which the resulting mixture is poured into a cold mold and then baked for 1 hour at 160° C. under a pressure of 40 kp/cm². After cooling, a homogeneous bubble-free plate having the following strength values can be removed from the mold:

| Flexural strength | (DIN 53452) | MPa | 128 |
|---|---|---|---|
| Impact strength | (DIN 53453) | kJ/m² | 9 |
| Martens temperature | (DIN 53462) | °C. | 168 |

(b) 4 parts by weight of the powder are mixed with 100 parts by weight of a quartz sand having a particle diameter of 1 mm. In addition, 1 part by weight of a solid amine accelerator (N,N,N',N'-tetramethyl-4,4'-diaminodiphenylmethane) is added. The gel time of this mixture is determined on a drop plate at 160° C. It amounts to 60 seconds. After 4 minutes, the solidified mass can be removed from the drop plate. The same mixture is poured into a steel mold (40×40×160 mm), which has been treated with a release agent and heated to 160° C., and compacted with a tamper. After 15 minutes, the mass has hardened completely and a test specimen having a flexural strength of 6 MPa.s after cooling can be removed from the mold.

(c) The powder is uniformly scattered onto a metal plate heated to 260° C. On contact with the metal, the powder melts immediately and forms a uniform, slightly foamed coating which assumes a duroplastic character after further hardening for 2 hours at 180° C.

What is claimed is:

1. A process for the production of polyurethanes which are solid, powderable and fusible and which contain free isocyanate and hydroxyl groups which will not react further below 100° C., comprising reacting organic polyhydroxyl compounds with organic polyisocyanates in quantitative ratios corresponding to an NCO/OH equivalent ratio of from 0.8:1 to 1.2:1, wherein said polyhydroxyl compounds are selected from the group consisting of:

(a) alkoxylation products of ammonia containing 3 hydroxyl groups and having a molecular weight of at least 149 and a hydroxyl group content of at least 12% by weight, (b) alkoxylation products of aromatic polyamines containing at least 4 hydroxyl groups and having a molecular weight of at least 284 and a hydroxyl group content of at least 12% by weight, (c) phenol/formaldehyde condensates containing at least 3 phenolic hydroxyl groups and having a phenolic hydroxyl group content of at least 12% by weight, (d) mixtures of (a), (b), and (c), and (e) mixtures containing at least 25% by weight of at least one of the polyhydroxyl compounds mentioned in (a), (b), and (c) with other polyhydroxyl compounds optionally containing ether or ester groups and having a molecular weight in the range of from 62 to 3000, said mixture having a mean OH functionality of at least 2.7 and a hydroxyl group content of at least 12% by weight wherein said reaction is conducted at a temperature from 0° to 100° C.

2. The product of the process of claim 1.

3. A process for the production of polyurethanes which are solid, powderable and fusible and which contain free isocyanate and hydroxyl groups which will not react further below 100° C., comprising reacting organic polyhydroxyl compounds with organic polyisocyanates in quantitative ratios corresponding to an NCO/OH equivalent ratio of from 0.8:1 to 1.2:1, wherein said polyhydroxyl compounds are selected from the group consisting of:
 (a) alkoxylation products of ammonia containing 3 hydroxyl groups and having a molecular weight of at least 149 and a hydroxyl group content of at least 12% by weight,
 (b) alkoxylation products of aromatic polyamines containing at least 4 hydroxyl groups and having a molecular weight of at least 284 and a hydroxyl group content of at least 12% by weight,
 (c) phenol/formaldehyde condensates containing at least 3 phenolic hydroxyl groups and having a phenolic hydroxyl group content of at least 12% by weight,
 (d) mixtures of (a), (b), and (c), and
 (e) mixtures containing at least 25% by weight of at least one of the polyhydroxyl compounds mentioned in (a), (b), and (c) with other polyhydroxyl compounds optionally containing ether or ester groups and having a molecular weight in the range of from 62 to 3000, said mixture having a mean OH functionality of at least 2.7 and a hydroxyl group content of at least 12% by weight,
wherein said reaction is conducted at a temperature from 100° to 250° C. and said reaction is terminated just before gelation of the reaction mixture, which is liquid at temperatures in this range, by cooling to a temperature below 100° C.

4. The product of the process of claim 3.

5. A process for the manufacture of cross-linked, infusible moldings comprising (A) producing polyurethanes which are solid, powderable and fusible and which contain free isocyanate and hydroxyl groups which will not react further below 100° C., by reacting organic polyhydroxyl compounds with organic polyisocyanates in quantitative ratios corresponding to an NCO/OH equivalent ratio of from 0.8:1 to 1.2:1 wherein said polyhydroxyl compounds are selected from the group consisting of:
 (a) alkoxylation products of ammonia containing 3 hydroxyl groups and having a molecular weight of at least 149 and a hydroxyl group content of at least 12% by weight,
 (b) alkoxylation products of aromatic polyamines containing at least 4 hydroxyl groups and having a molecular weight of at least 284 and a hydroxyl group content of at least 12% by weight,
 (c) phenol/formaldehyde condensates containing at least 3 phenolic hydroxyl groups and having a phenolic hydroxyl group content of at least 12% by weight,
 (d) mixtures of (a), (b), and (c), and
 (e) mixtures containing at least 25% by weight of at least one of the polyhydroxyl compounds mentioned in (a), (b), and (c) with other polyhydroxyl compounds optionally containing ether or ester groups and having a molecular weight in the range of from 62 to 3000, said mixture having a mean OH functionality of at least 2.7 and a hydroxyl group content of at least 12% by weight
wherein said reaction is conducted at a temperature from 0° to 100° C., (B) heating the product of (A) in a mold after or during formation to between 100° to 250° C. until hardened optionally after powdering or dissolution in a suitable solvent optionally after admixture with further auxiliaries and additives.

6. A process for the manufacture of cross-linked, insoluble moldings comprising (A) producing polyurethanes which are solid, powderable and fusible and which contain free isocyanate and hydroxyl groups which will not react further below 100° C., by reacting organic polyhydroxyl compounds with organic polyisocyanates in quantitative ratios corresponding to an NCO/OH equivalent ratio of from 0.8:1 to 1.2:1, wherein said polyhydroxyl compounds are selected from the group consisting of:
 (a) alkoxylation products of ammonia containing 3 hydroxyl groups and having a molecular weight of at least 149 and a hydroxyl group content of at least 12% by weight,
 (b) alkoxylation products of aromatic polyamines containing at least 4 hydroxyl groups and having a molecular weight of at least 284 and a hydroxyl group content of at least 12% by weight,
 (c) phenol/formaldehyde condensates containing at least 3 phenolic hydroxyl groups and having a phenolic hydroxyl group content of at least 12% by weight,
 (d) mixtures of (a), (b), and (c), and
 (e) mixtures containing at least 25% by weight of at least one of the polyhydroxyl compounds mentioned in (a), (b), and (c) with other polyhydroxyl compounds optionally containing ether or ester groups and having a molecular weight in the range of from 62 to 3000, said mixture having a mean OH functionality of at least 2.7 and a hydroxyl group content of at least 12% by weight, wherein said reaction is conducted at a temperature from 100° to 250° C. and said reaction is terminated just before gelation of the reaction mixture, which is liquid at temperatures in this range, by cooling to a temperature below 100° C., (B) heating the product of (A) in a mold to between 100° to 250° C. until hardened, optionally after powdering or dissolution in a suitable solvent and optionally after admixture with further auxiliaries and additives.

* * * * *